United States Patent
Atkin

(10) Patent No.: US 7,996,207 B2
(45) Date of Patent: Aug. 9, 2011

(54) BIDIRECTIONAL DOMAIN NAMES

(75) Inventor: Steven Edward Atkin, Palm Bay, FL (US)

(73) Assignee: International Business Machines Corporation, Armonk, NY (US)

( * ) Notice: Subject to any disclaimer, the term of this patent is extended or adjusted under 35 U.S.C. 154(b) by 2756 days.

(21) Appl. No.: 09/891,341

(22) Filed: Jun. 26, 2001

(65) Prior Publication Data

US 2003/0110021 A1    Jun. 12, 2003

(51) Int. Cl.
G06F 17/20    (2006.01)
(52) U.S. Cl. ................................ 704/1; 704/8
(58) Field of Classification Search ................. 704/2, 8, 704/277, 1; 715/536
See application file for complete search history.

(56) References Cited

U.S. PATENT DOCUMENTS

| | | | |
|---|---|---|---|
| 4,507,734 A | 3/1985 | Kaldas | |
| 5,539,661 A | 7/1996 | Nordenstam | |
| 5,572,727 A | 11/1996 | Larsson et al. | |
| 5,784,069 A * | 7/1998 | Daniels et al. | 345/467 |
| 5,793,381 A | 8/1998 | Edberg et al. | |
| 5,883,986 A | 3/1999 | Kopec et al. | |
| 5,889,481 A | 3/1999 | Okada | |
| 5,929,792 A | 7/1999 | Herriot | |
| 5,946,499 A | 8/1999 | Saunders | |
| 5,946,648 A | 8/1999 | Halstead et al. | |
| 6,055,365 A | 4/2000 | Tye | |
| 6,070,179 A | 5/2000 | Craft | |
| 6,151,624 A | 11/2000 | Teare et al. | |
| 6,204,782 B1 | 3/2001 | Gonzalez et al. | |
| 6,243,701 B1 | 6/2001 | Shih et al. | |
| 6,275,789 B1 * | 8/2001 | Moser et al. | 704/7 |
| 6,324,500 B1 | 11/2001 | Amro et al. | |
| 6,397,259 B1 | 5/2002 | Lincke et al. | |
| 6,438,516 B1 | 8/2002 | Davis | |
| 6,493,735 B1 * | 12/2002 | Kumhyr | 715/536 |
| 6,611,845 B1 | 8/2003 | Dockter et al. | |
| 6,738,827 B1 * | 5/2004 | Abir | 709/245 |
| 6,937,975 B1 | 8/2005 | Elworthy | |
| 6,944,820 B2 * | 9/2005 | Feinberg | 715/526 |
| 7,120,900 B2 | 10/2006 | Atkin | |
| 7,293,229 B2 | 11/2007 | Feinberg | |
| 7,366,977 B2 | 4/2008 | Chokshi | |
| 2002/0030689 A1 | 3/2002 | Eichel et al. | |

(Continued)

OTHER PUBLICATIONS

Glosassy of Unicode Terms, http://www.unicode.org/glossary (last visited Jan. 28, 2009), pp. 1, 13, and 23 of 41 printout pages.*

(Continued)

Primary Examiner — Angela A Armstrong
(74) Attorney, Agent, or Firm — Robert H. Frantz; Libby Z. Toub

(57) ABSTRACT

A multilingual bidirectional domain name is produced by receiving a domain name having characters from at least two character sets with different display orders with just one direction of reading; breaking domain name into labels delimited by a full stop punctuation marks, the labels having an original label display order as encountered from left to right; within a label, resolving display directions of indeterminate display order characters by assigning a strong reading direction left-to-right display order to each indeterminate display order character; subsequently, reordering the characters within each of the labels into a display order using the fully resolved characters while preserving the original label display order and wherein bidirectionality of characters within each label is produced, so that produced the multilingual bidirectional domain name contains at least two different directions of reading across the entire converted address; and, displaying the multilingual bidirectional domain name on a computer display.

15 Claims, 3 Drawing Sheets

30 — ABC.ibm.com

31 — ibm.com.ABC

32 — ibm.com.CBA

33 — CBA.ibm.com

U.S. PATENT DOCUMENTS

| | | |
|---|---|---|
| 2002/0143521 A1 | 10/2002 | Call |
| 2002/0156688 A1 | 10/2002 | Horn et al. |
| 2002/0156888 A1 | 10/2002 | Lee et al. |
| 2003/0115040 A1* | 6/2003 | Xing .................................. 704/8 |
| 2004/0039996 A1* | 2/2004 | Flam ............................. 715/536 |
| 2006/0080641 A1 | 4/2006 | Taylor et al. |

OTHER PUBLICATIONS

Wikipedia, http://en.wikipedia.org/wiki/Domain_name (last visited Jan. 28, 2009).*

Wikipedia, http://en.wikipedia.org/wiki/Bi-directional_text (last visited Jan. 28, 2009).*

Atkin, Steven and Stansifer, Ryan, "Implementations of Bidirectional Reorder Algorithms." 18th International Unicode Conference, Apr. 2001.

Unicode Consortium, The, "Unicode Standard Annex #15—Unicode Normalization Forms" published at http://www.unicode.org/unicode/reports/tr15. retrieved Jun. 15, 2001.

Mockapetris, P., "RFC 1034—Domain Names Concepts and Facilities." published at http://www.cis.ohio-state.edu/cgi-bin/rfc/rfc1034.html. retrieved Jun. 25, 2001.

Unicode Consortium, The, "Unicode Standard Annex #9—The Birdirectional Algorithm." published at http://www.unicode.org/unicode/reports/tr9, retrieved Jun. 25, 2001.

USPTO; Image File Wrapper containing Office Actions, Applicant Replies and Information Disclosure Statements from U.S. Appl. No. 09/838,376, now U.S. patent 7,086,004, filed Apr. 19, 2001 by Steven Edward Atkin; retrieved on Nov. 4, 2009 from www.uspto.gov PAIR, pp. 1-187.

USPTO; Image File Wrapper containing Office Actions, Applicant Replies, and Information Disclosure Statements from U.S. Appl. No. 09/931,302, now U.S. 6,883,007, filed on Aug. 16, 2001 by Steven Edward Atkin; retrieved on Nov. 4, 2009 from USPTO Public PAIR; pp. 1-146.

USPTO, Image File Wrapper containing Office Actions, Applicant Replies, and Information Disclosure Statements for U.S. Patent 7,120,900; U.S. Appl. No. 09/838,377; filed Apr. 19, 2001 by Steven Edward Atkin; retrieved from USPTO PAIR on Nov. 4, 2009, pp. 1-227, Davis, Mark;"The Bidirectional Algorithm", cited in Office Action dated Mar. 18, 2010 by Examiner in related U.S. Appl. No. 11/463,131, filed on Aug. 8, 2006, by Steven Edward Atkin.

Hutton, Graham M;"comp.lang.functional", cited in Office Action dated Mar. 18, 2010 by Examiner in related patent U.S. Appl. No. 11/463,131, filed on Aug. 8, 2006, by Steven Edward Atkin.

Stansifer, Ryan;"Computer Science Technical Reports", cited in Office Action dated Mar. 18, 2010 by Examiner in related U.S. Appl. No. 11/463,131, filed on Aug. 8, 2006, by Steven Edward Atkin.

Stansifer, Ryan;"Implementations of Bidirectional Reordering Algorithms", cited in Office Action dated Mar. 18, 2010 by Examiner related U.S. Appl. No. 11/463,131, filed on Aug. 8, 2006, by Steven Edward Atkin.

USPTO; recent examination correspondence in related U.S. Appl. No. 11/463,131, filed by Steven Edward Atkin on Aug. 8, 2006.

USPTO; recent patent examination correspondence (request for pre-appeal review) in related U.S. Appl. No. 11/465,131, filed on Aug. 8, 2006 by Steven Edward Atkin.

Atkin, Steven; recently filed Appeal Brief in related U.S. Appl. No. 11/463,131.

USPTO; recent patent examination correspondence in related U.S. Appl. No. 11/465,131, filed on Aug. 8, 2006 by Steven Edward Atkin.

* cited by examiner $^{10}$ ÷ — U01D7 — ÷

$^{20}$ UFB01 — ü

$^{30}$ ABC.ibm.com $^{31}$ ibm.com.ABC $^{32}$ ibm.com.CBA $^{33}$ CBA.ibm.com

Figure 3

40 NOP--123

41 --123PON 42 123--PON

Figure 4

50 abcFED 51 abcDEF

52 DEFabc

Figure 5

60 AB12CDE678FGHI

61 IHGF678EDC12BA

Figure 6

BIDIRECTIONAL DOMAIN NAMES

CROSS-REFERENCE TO RELATED APPLICATIONS

CLAIMING BENEFIT UNDER 35 U.S.C. 120

Not applicable.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This invention relates to the arts of computer and information displays for multiple languages, alphabets, and scripts. The invention relates especially to the arts of human interfaces (input, display, output) concerning computer network and World Wide Web addresses in languages which require bidirectional display and presentation.

2. Description of the Related Art

The World Wide Web and the Internet have become everyday technologies in most developed economies, and is now becoming an integral part of the process in developing economies. Its ability to communicate information, both in written form such as web pages, graphic form such as photos and videos, and data form such as extensible markup language (XML), is becoming a key factor to every industry in every country of the world.

However, the current technologies supporting the World Wide Web are "English-centric" due to the roots of the beginning of the Internet being an American and European effort. As such, many of the conventions and "standards" employed in servers, routers, e-mail protocols, etc., employ an English alphabet with English-like syntax. Initially, companies and individuals in non-English countries were able to adopt and use these technologies due to their ability to work in both their native language and English.

It is, though, possible that certain information and concepts cannot be mapped into English from a native language, and thus represents an inability of the English-centric World Wide Web (WWW) to effectively communicate this information and these concepts. Further, the successfulness with which consumers may "find" a business on the WWW depends on their ability to input or select a web address which is logical and rational. If a business has a native language name, there may not be a logical or rational English equivalent. As such, businesses which primarily deal in non-English marketplaces may find their success in "going online" less than optimal given that they must adopt an English domain name.

Unicode's ability to represent multilingual text makes it a good candidate for establishing the basis for a domain name structure. Unicode brings not only an encoding framework, but also support handling display requirements such as bidirectional scripts. The collection of Unicode's character equivalences is both desirable, and at times necessary, given Unicode's goal of encoding natural language text. These equivalences, however may present problems in the context of domain names.

Unicode's BiDirectional (Bidi) algorithm may be unsuitable for determining an appropriate display ordering for domain names. Specifically, the Bidi algorithm itself possesses a set of implicit assumptions about the usage of common characters. This set of assumptions may not be applicable to domain names. Domain names use the same repertoire of characters that appear in text. This requires a different algorithm for handling domain names.

The transition from the now ubiquitous monolingual ASCII based domain name system to a truly multilingual extendable system has been long awaited. Indeed, it may have already begun without waiting for standards to be developed. This move brings the goal of realizing a multilingual World Wide Web one step closer. Nevertheless, this transition must be approached cautiously as decisions made today may have long lasting effects. These decisions include the set of characters for constructing names, the base character encoding, and the codepoint transmission protocol.

There are, however, certain constraints that must be observed, regardless of these decisions. For example, domain names that are "legal" today must still remain legal in the new domain name system, otherwise the new system will not receive widespread acceptance. It is impractical to expect a vast overhaul or retrofit of thousands or millions of content servers, domain name servers, and routers in order to support a new, non-backwards-compatible domain name system.

A likely starting point for choosing the allowable set of characters from which domain names may be constructed is to start with the character repertoire available in the well-known Unicode/ISO10646 standard. The range of characters available in Unicode is vast and accommodates most modern written scripts. In contrast to ASCII, it includes scripts such as Arabic, Farsi and Hebrew.

At first glance, extending the current domain name system may not seem to be much of a challenge, given that all that needs to be done is to add more characters to the script. However, unlike ASCII, which only encodes scripts written and displayed in a left-to-right order, Unicode encodes scripts written right-to-left, as well as those written left-to-right. Additionally, in Unicode, it is perfectly "legal" to intermix these scripts, which provides not only for a wider variety of single-language displays, but also for displays of mixed content. However, when these scripts are intermixed, their display may become ambiguous, due to the conflicting directions.

In creating a new domain name system, such ambiguities must not exist. The display of such domain names can not simply be left up to the user or application software, which would certainly lead to confusion.

In order to alleviate this situation, a BiDirectional domain name method and system must not allow for ambiguities in the interpretation, display, or analysis of a BiDirectional domain name. Additionally, this method and system must be both simple to understand, easy to implement, and inexpensive to execute, in order to facilitate its widespread acceptance and use.

Therefore, there is a need in the art for a system and method which allows domain names to be handled and displayed with different (non-English) reading orders. Further, there is a need in the art for this system and method to be readily usable within the currently deployed technologies of the World Wide Web, and compatible with existing methods and systems such as Unicode's BiDi algorithm.

BRIEF DESCRIPTION OF THE DRAWINGS

The following detailed description when taken in conjunction with the figures presented herein provide a complete disclosure of the invention.

FIG. 1 shows an example of two different logical encodings of a Latin capital letter "u" with diaeresis and acute, which should ideally represent in the same display order.

FIG. 2 shows an example of characters which are glyph variants of other characters, namely the "fi" sequence.

FIG. 3 illustrates issues involved with interpreting and displaying typical domain names using the well-known Unicode BiDi algorithm, and the ambiguity which can result.

FIG. 4 illustrates similar ambiguities which may arise when interpreting strings containing the hyphen-minus "-" character, also of significant importance to the display of multilingual domain names.

FIG. 5 shows an example of ambiguities which arise when a label within a domain name contains characters with varying directions.

FIG. 6 illustrates a string reversal operation where digits are treated as units.

SUMMARY OF THE INVENTION

Figure 7:
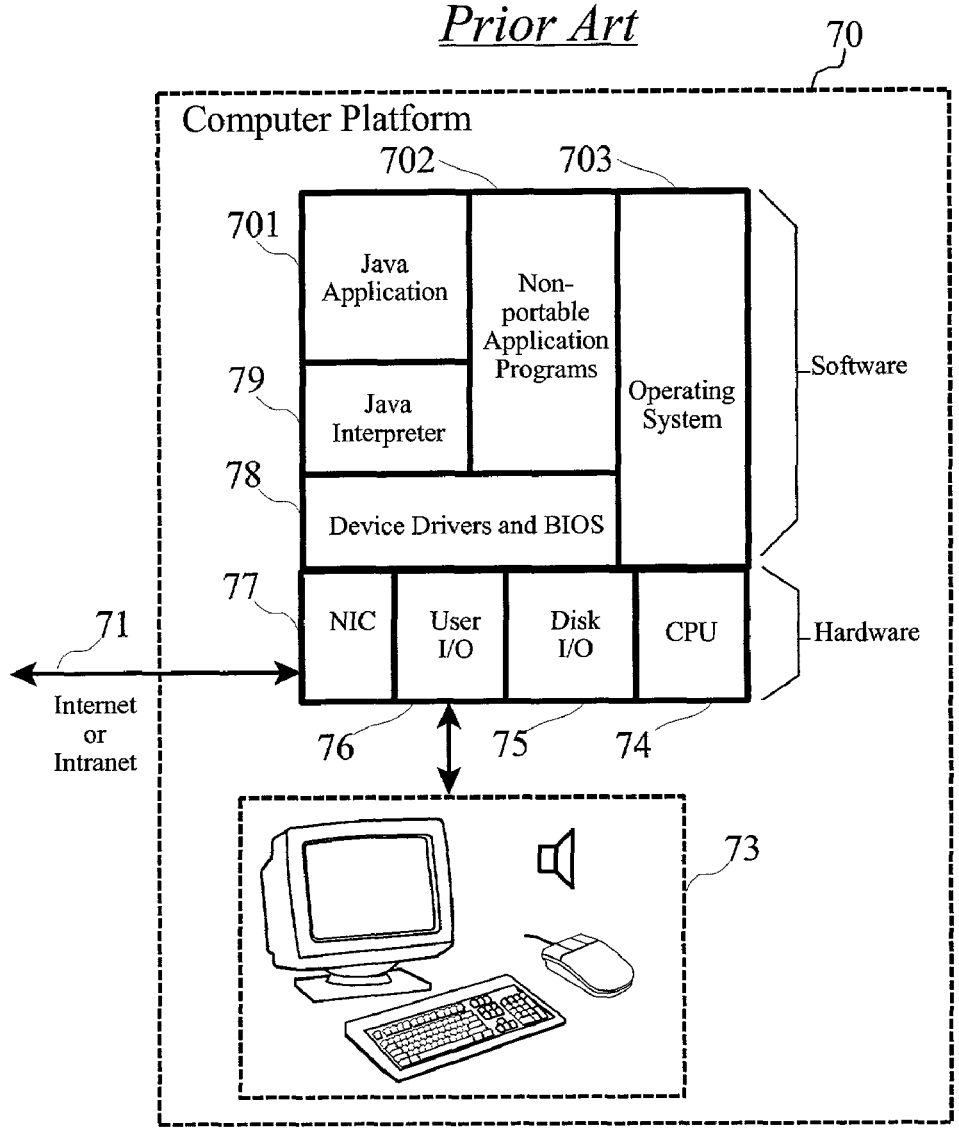
FIG. 7 sets forth the well-known organization of computer platforms such as web browser computers, web servers, and personal computers.

A multilingual bidirectional domain name is produced by receiving a domain name having characters from at least two character sets with different display orders with just one direction of reading; breaking domain name into labels delimited by a full stop punctuation marks, the labels having an original label display order as encountered from left to right; within a label, resolving display directions of indeterminate display order characters by assigning a strong reading direction left-to-right display order to each indeterminate display order character; subsequently, reordering the characters within each of the labels into a display order using the fully resolved characters while preserving the original label display order and wherein bidirectionality of characters within each label is produced, so that produced the multilingual bidirectional domain name contains at least two different directions of reading across the entire converted address; and, displaying the multilingual bidirectional domain name on a computer display.

DETAILED DESCRIPTION OF THE INVENTION

In accordance with the objectives of the present invention, a primary goal of a multilingual domain name display and analysis system and method is to unambiguously represent multilingual domain names. Optimally, the multilingual domain name system and method must also:
(a) provide a one-to-one mapping between names in logical order and names in display order;
(b) be consistent with Unicode's Bidirectional Algorithm when possible;
(c) be easy to understand and simple to implement;
(d) absent of requirement for any form of normalization; and
(e) minimize impact to the current DNS architecture.

The present invention is preferably realized as a function or method in computer-executable software for Internet servers, clients, and routing devices. Turning to FIG. 7, a generalized organization of such a computer platform (70) is shown. The computer platform (70) has a central processing unit (CPU) (74), a set of device drivers and a basic input/output system (BIOS) (78), and typically an operating system (703), such as Linux, UNIX, or Microsoft Windows [TM].

Most computer platforms, such as a personal computer, are also equipped with disk interfaces (75) and disks; user device I/O (76) to interface to keyboards, pointing devices, and a display; and a network interface card or device (77) allowing communications to a computer network, wireless network, or the Internet. Some computer platforms, such as personal digital assistants, web-enabled telephones, and Internet appliances may not be provided with all of these components, but in general, the functionality of these components is present in some form.

The computer platform (70) is also typically provided with one or more non-portable, machine-specific application programs (702).

According to the preferred embodiment, the computer platform (70) is provided with a Java interpreter (701), which are freely available for a variety of operating systems and computer platform, and which are well-known in the art.

The remainder of this disclosure is given with respect the logical methods to be realized in computer executable software, and preferably realized in a Java program, applet or servlet.

When domain names are interspersed within natural language text the problem of displaying the text and domain names becomes rather complex. This complexity, however can be managed if the problem is broken into separate and distinct phases. The problem with simply modifying the Unicode Bidirectional Algorithm to accommodate domain names is it makes an already complex algorithm even more difficult to manage.

The essence of the Unicode Bidirectional Algorithm is first to perform contextual analysis on the text and then determine where the boundaries of the directional runs are. The general problem with this strategy is that as technology continues to expand greater and greater demands will be placed upon the bidirectional algorithm to always correctly render any and all textual data causing the algorithm to be in a constant state of flux.

When Unicode performs contextual analysis on text it overrides the static proprieties assigned to some of the characters. Specifically this occurs during the processing of weak and neutral types. Separating this portion of the algorithm from resolving implicit levels and reordering levels greatly extends the applicability of the algorithm. Ideally the analysis of the text should be distinct from the actual determination of directional boundaries.

During the analysis phase, domain names, mathematical expressions, phone numbers, and other higher order data elements are detected. Nevertheless, it is impossible to create an computer-implemented process that can always correctly identify such elements. The real issue is whether or not it is possible to create a computer-implemented process that identifies such elements within some reasonable range of error and under a set of acceptable constraints for the elements themselves.

The determination as to whether a stream contains a domain name is rather straightforward if the domain name is preceded by some special identifier. Specifically, "http://", "ftp://", or "telnet://". When these identifiers are not present, however the ability to recognize a domain name becomes greatly diminished. The authors believe it is unreasonable to force every domain name to be preceded by some special signal. There are many cases where it is inappropriate to specify the protocol. For example, consider the case where a marketing memo specifies the name of some website.

For better understanding of the present invention, following conventions are used in examples throughout this disclosure, as patent disclosures themselves do not lend themselves well to BiDirectional and non-English script text:

(a) uppercase letters "A" through "M" are used to represent Arabic letters,
(b) uppercase letters "N" through "Z" are used to represent Hebrew letters,
(c) digits "0" (zero) through "4" are used to indicate European numerals, and
(d) digits "5" through "9" are used to indicate Arabic numerals.

This representation is summarized in Table 1, which is the same convention used by Unicode to discuss the input and output of the Unicode Bidirectional Algorithm.

TABLE 1

Bidirectional character mappings

| Type | Mapping |
| --- | --- |
| L | a-z |
| AL | A-M |
| R | N-Z |
| AN | 5-9 |
| EN | 0-4 |

The richness of characters available in Unicode is certainly an asset when used to encode natural language text. Nevertheless, this richness is something that is not necessarily desirable when encoding domain names. The various ways in which characters can be constructed in Unicode, both "precomposed" and "decomposed", makes the representation of domain names unnecessarily complex.

This complexity presents two significant problems for encoding domain names: domain name registration and domain name equivalence. Historically, these have not been a problem, because it made no difference whether the registration of a domain name was based upon characters or codepoints. In ASCII, there is no distinction between characters and codepoints, however in Unicode such a distinction becomes necessary at times.

In Unicode, characters that contain diacritic marks may be represented in two ways: "precomposed" form and "decomposed" form. Characters in precomposed form are represented by a single codepoint, while characters in decomposed form are constructed from multiple codepoints.

For example, the Latin capital letter "u" with diaeresis and acute can be encoded in three different ways (10, 11, 12) in Unicode, as shown in FIG. 1. In all cases, the same visual output or display is produced irrespective of the sequence of codepoints.

This has a significant impact on the clear representation of data and especially for domain names. If domain names are registered by characters and not by codepoints, then domain name servers and/or client systems will be required to perform some form of normalization.

Alternatively, if domain names are registered via codepoints and not by characters, then normalization becomes a non-problem. On the other hand, it forces the registration of multiple names (equivalent encodings) that really represent the same name.

Further complicating matters is the fact that Unicode also encodes some characters that are merely glyph variants of other characters. This situation also requires some form of normalization. For example, the two character sequence "fi" may be represented in two ways (20, 21) in Unicode, as shown in FIG. 2. The first encoding (20) uses a single codepoint, while the second encoding (21) uses two codepoints. In either case, both sequences encode the same semantic content, with the only difference being the glyph used to render the sequence.

In a first aspect of the present invention, a method is adopted in which only decomposed characters are used in cases where there are no corresponding precomposed characters. This significantly simplifies and facilitates the task of determining name equivalence, as each domain name has a unique representation under this scheme.

In a second aspect of the present invention, characters which are glyph variants of other characters (compatibility characters) are not allowed to be used in domain names. While at first this may seem too restrictive, it is nothing more than an artificial restriction. In reality, there is no need for compatibility characters, as domain name distinction or equivalence is not based upon visual appearance. Further, these characters are unnecessary for legacy data conversion as they are encoded in ASCII now.

In a third aspect of the invention, control codes are excluded from the new multilingual domain names as they currently are today. These include the bidirectional controls, as well, such as LRE, LRO, LRM, RLE, RLO, RLM, and PDF. The purpose of these controls is to override the behavior of Unicode's Bidirectional Algorithm. In most situations, Unicode's Bidirectional Display Algorithm produces acceptable results when rendering natural language text. The use of these controls is only required in the rarest of situations, and thus their elimination outweighs any potential benefits.

Naturally, the set of allowable domain name characters must expand to include Arabic and Hebrew letters, however Unicode has many codepoints for the Arabic writing system and the Hebrew writing system. Not all of these code points are required in the context of domain names.

In another aspect of the present invention, a number of Arabic characters are safely excluded from multilingual domain names, including the Arabic presentation forms, UFB50-UFDFF and UFE70-UFEFC. It is safe to exclude these characters, as they only represent ligatures and glyph variants of the base nominal Arabic characters. Additionally, the Arabic points U064B-U0652, U0653-U0655, and U0670 may also be excluded. In most cases, the Arabic points are only used as pronunciation guides. If the points were to be included, then names that differed only in their use of points would be treated as if they were distinct and different names. This is not unlike the English homonyms "read" and "read", which are ambiguous. Removing the Arabic points eliminates such problems, with the understanding that not every Arabic word would be able to be uniquely represented.

Further, the Koranic annotation signs U06D6-U06ED can also be eliminated from domain names, as they are not used to distinguish one name from another.

In Hebrew, the cantillation marks U0591-U05AF and Hebrew points UFB0-U5C4 are preferably excluded from multilingual domain names, as they are predominately used as pronunciation guides and for indicating the underlying structure of text. Additionally, the Arabic and Hebrew punctuation characters are also excluded from domain names, as they are currently not permitted or used in domain names. Table 2 summarizes the list of acceptable Arabic and Hebrew characters.

TABLE 2

Acceptable Arabic and Hebrew characters

| Unicode Range | Script | Notes |
| --- | --- | --- |
| U05D0-U05F4 | Hebrew | ISO8859-8 |
| U0621-U064A | Arabic | ISO8859-6 |
| U0660-U0669 | Arabic | Arabic-Indic digits |
| U0671-U06D3, U06D5 | Arabic | Extended Arabic letters |
| U06F0-U06FE | Arabic | Persian, Urdu, and Sindhi |

Unicode's ability to intermix the varoius script systems of the world makes the creation of multilingual documents no more difficult than the creation of monolingual documents. This new found freedom, however does come with a cost. When various script systems are intermixed, their display may become unclear.

Unicode provides an algorithm for determining the appropriate display order given an arbitrary sequence of characters in logical order. The algorithm is based upon a set of implicit heuristics along with a set of explicit control code overrides. These control codes are used in cases where the implicit rules do not yield an appropriate display order.

One may naturally assume that since Unicode characters are going to be used in domain names, then Unicode's Bidirectional Algorithm should also be used. Upon closer examination, it becomes apparent that this approach or assumption is inappropriate. The input to Unicode's algorithm carries with it a set of assumptions. The primary assumption being that the input is natural language text in general. This assumption, however is not necessarily true in the case of domain names. A domain name does not resemble a paragraph of multilingual text. So, different assumptions regarding the content of a multilingual domain name must apply. This contextual difference causes several problems when one attempts to apply the Unicode Bidirectional Algorithm to domain names.

The first problem to be encountered is the use of the full stop character, U002E, within domain names. When a full stop occurs in natural language text, its purpose cannot be immediately determined. The meaning of the full stop is dependent upon the context in which it is used. It may indicate the end of a sentence, an abbreviation, or even a floating point number, such as specified in rules W4 and W5 in Unicode Standard Annex #9.

When a full stop, however, is present in a domain name, its meaning is clear. The meaning of the full stop never varies across domain names. The full stop always serves to separate a domain name into its individual parts or "labels". Furthermore, the full stop establishes the hierarchy of the individual labels. In domain names, there is a strict hierarchy regarding the ordering of the labels. The most general part of the domain name is always the rightmost label, while the most specific part of the name appears as the leftmost label (e.g. "subdomain" labels). This requires a domain name to be read and interpreted in a general left-to-right, English-like direction.

When the Unicode Bidirectional Algorithm's rules are applied to text, it is done on a per paragraph basis. Each paragraph is rendered independently of each other. Unfortunately, when the Unicode Bidirectional Algorithm is applied to domain names, each domain name label is not rendered independently of the others, and as such, each domain name label may influence the rendering of the others. To solve this problem, the method of the present invention implements the full stop character as if as if it were the start of a new paragraph in the context of domain names. Additionally, each domain name is rendered in an overall left-to-right reading direction so as to preserve domain name label hierarchy.

The Unicode Bidirectional Algorithm determines the general reading direction of a paragraph in one of two ways. The first method is based upon a higher order protocol explicitly stating the reading direction; the second method makes use of an implicit rule whereby the first strong directional character determines the overall reading direction. In this context the term "strong" indicates a character that is either a left-to-right character or a right-to-left character. This implicit rule, however causes problems for rendering domain names, as shown in FIG. 3.

The first display (30) of FIG. 3 is a "normal" domain name in presented logical order. The corresponding output from the Unicode Bidirectional Algorithm (32) shows how the presence of an Arabic character in the first label forces the entire domain name to incorrectly be given a right-to-left reading or display. This unfortunately mangles the hierarchical structure of the domain name, making it impossible to universally determine which label is the most specific and which is the most general. This, of course, would result in user difficulties reading and understanding a Universal Resource Locator (URL) or domain name, and certainly would be impossible to correctly route hyper text transfer protocol (HTTP) messages, file transfer protocol (FTP) transactions, and the like.

Some may argue that if the overall reading direction is known, in this instance right-to-left, then the hierarchy of the individual labels can be determined. This statement is not true in multilingual domain names, however.

In many cases it is impossible to tell the overall reading direction by merely looking at the output. It turns out that it is impossible to obtain the same output "display order" given two distinct inputs in logical order. In this example, the "normal" input (30) and an alternative input (31) produce the same output or display (32). In this case, the most specific part of the name of the "normal" input (30) "ABC", while in the alternative input (31) is "bm". This does not indicate that there is a flaw in Unicode's algorithm, rather it only further illustrates the impact of the assumptions concerning the intended use of the Unicode Bidirectional Algorithm.

Normally, in natural language text processing, this is not a problem given that the two orderings can be distinguished by their physical justification on the screen, either right or left. This factor, however, is not available to domain name displays. When a domain name appears in printed text, there is no generally accepted way to indicate the overall reading direction.

Nonetheless, some may argue that if the entire domain name is in Arabic, then the label hierarchy should be reversed. The problem in adopting this strategy occurs when the entire domain name is not from the same script, as is the case in this example. The method of the invention provides a more desirable multilingual output (4) as illustrated in FIG. 3, wherein the "ABC" label is a right-to-left language component of the domain name, and the "ibm" and "com" labels are left-to-right components of the multilingual domain name. This output is consistent with the current structure of domain names. In this case the full stop characters are ignored, and the bidirectional algorithm is applied to each of the individual labels of the domain name.

One might assume that Unicode's Bidirectional Algorithm may still be appropriate if it is run independently on each of the individual labels. This strategy also presents problems, however. The problem with this approach involves the use of the hyphen-minus character "–", U002D. In the Unicode Bidirectional Algorithm, the hyphen-minus is assigned to the European Terminator character class. Unfortunately, this causes the character to behave as if it were an European numeral when adjacent to European numerals, as specified in rule W5 in Unicode Standard Annex #9.

This behavior may be acceptable when processing natural language, but is unacceptable when processing multilingual domain names. In multilingual domain names, the predominant usage of the hyphen-minus is as white space, and not as an European terminator, as illustrated in FIG. 4. A single domain name label in logical order (40) is presented, with the same label shown in display order (41) which is the output of the Unicode Bidirectional Algorithm. If the hypen-minus characters are treated as white space characters consistent with their use in domain name, the third display order (42) is obtained. Evident from this example is the fact that the Unicode Bidi algorithm is inappropriate for yet another reason for displaying multilingual domain names.

Yet another problem occurs when an individual label contains characters with varying directions. In this situation, the reading order of a label may become ambiguous, as illustrated in FIG. 5, wherein an individual label is shown in display order (50). Unfortunately, there are two possible readings "logical order" associated with this output (51 and 52). According to another aspect of the present invention, it is assumed that in such a mixed case, a label always takes a general left-to-right reading, which allows only one possible reading. This policy is consistent with the overall left-to-right reading of a domain name. Nevertheless, the Unicode algorithm still maps the two logical inputs to the single display output even when the overall reading direction is fixed to left-to-right. This situation potentially causes problems for domain name resolution.

Further according to the present invention, multilingual domain name registration is made in logical order. This policy is consistent with how bidirectional data is generally stored in files today. If the Unicode Bidirectional Algorithm is permitted to be used for the display of domain names, then there may be situations when a domain name can not be resolved even when it appears to be entered correctly. One possible solution to this situation is to register multiple logical names that yield the same display order. However, according to the method of the invention, a better approach is provided which eliminates this many-to-one relationship. Using the method of the invention, each display order is mapped to one and only one logical input, and each logical input is mapped to one and only one display output. This policy comes with some associated cost, however. There maybe cases where the reading may seem unnatural. It is believed, however, that this will occur infrequently and that the benefits outweigh any potential misreading.

The method of the invention is divided into two phases: inferencing and reordering. Inferencing resolves the direction of indeterminate characters, such as the fall stop or "dot", hyphen-minus, Arabic numeral, and European numeral. During this phase each character is assigned a strong direction, either left or right. The reordering phase takes the fully resolved characters and generates a display ordering for them.

The inferencing phase is accomplished in several passes. In the first pass Arabic and Hebrew letters are assigned the right-to-left direction, while fall stops and other alphabetic characters are assigned the left-to-right direction. The next set of passes resolves the directions of digits.

There are two rules for resolving the direction of Arabic and European numerals. All Arabic numerals are assigned the right-to-left direction. European numerals are assigned the left-to-right direction, unless the European numeral is surrounded by right-to-left characters (Arabic or Hebrew letters), in which case it takes the right-to-left direction. This is accomplished in two passes -a forward pass and a reverse pass.

The final set of passes resolves the directions of hyphen-minus characters. There are two rules for the resolution of hyphen-minus characters. All hyphen-minus characters become left-to-right, unless the hyphen-minus is surrounded by characters whose direction is right-to-left in which case the hyphen-minus becomes right-to-left. This is the same resolution as digits, but occurs after digit resolution. At this point each character in the domain name has a strong direction.

According to the preferred embodiment, the resolution of digits and letters makes use of a few simple data structures. A digit accumulator holds a sequence of European or Arabic numerals. A character stack holds Arabic letters, Hebrew letters, and sequences of digits. A mode variable keeps track of the current direction.

Further, the preferred embodiment makes use of a few simple operations on these data structures, including a "clear" operation, which outputs each digit from the digit accumulator, then outputs each character from the character stack, and finally outputs the current character. After this operation, the digit accumulator and the character stack are left empty.

An "empty" operation outputs each character from the character stack, then outputs each digit from the digit accumulator, and finally outputs the current character. After this operation, the digit accumulator and the character stack are empty.

A "push" operation places the contents of the digit accumulator onto the character stack, and then pushes the current character onto the stack. After this operation the accumulator is empty.

An "accumulate" operation appends the current character onto the digit accumulator.

The preferred embodiment of the inventive method for resolving letters and digits is disclosed in pseudo-code in Table 3.

TABLE 3

Pseudo-code for Resolving Letters and Digits

```
current_character = first character or digit in input_stream
Until end_of_input_stream:
    If (current_character is a left-to-right character) then
        If (mode = left-to-right) then
            perform EMPTY
            else perform CLEAR
        endif
        mode = left-to-right
    endIf
    If (current_character is a right-to-left character) AND
        (current_character is not a digit) then
        mode = right-to-left
        perform PUSH
    endIf
    If (current_character is a numeral with right-to-left direction) then
        mode = right-to-left
        perform ACCUMULATE
    endIf
    current_character = next character or digit from input stream
endUntil    /* end of loop to process each char from input stream */
If (mode = left-to-right) then
    perform EMPTY
else
    perform CLEAR
endIf
```

The bidirectional domain name display method shown in Table 3 converts a string of characters in logical order to a string of the same length in display order. In fact, the method is its own inverse, e.g. A(A(x))=x. Hence, this method is a one-to-one function. To further support this rationale, there are several indicators of the behavior of the method which are true of such types of methods. First, it is obvious that the method loses no characters, so the output is a string of the same length as the input string. Second, all left-to-right runs, including full stop and certain hyphen-minus characters, are preserved in exactly their original positions within the resultant string. Third, all right-to-left runs are permuted within their own run. No characters "leak", "flop" or move to another run and the right-to-left runs are preserved in their same order. Finally, the right-to-left runs are reversed (approximately).

The nature of reversing right-to-left runs requires further explanation as the numerals (Arabic and European) complicate the matter. FIG. 6 shows a sample logical right-to-left string (60), and its corresponding display (61). The output (61) is a string reversal treating digits as units. Hence, this sort of reversal is its own inverse. Therefore, the whole method is its own inverse.

This method can be used to accommodate two different groups of domain name creators. One group knows what they want to register, but they are unsure how it will be displayed. On the other hand, there are creators who know what they want to see displayed, but are unsure what logical sequence of characters should be registered. This single universal method addresses both of these situations, which eliminates the need for specialized individual method.

The disclosed logical methods are preferably realized in software executable by a web server, such as a Java servlet, or by a web client, such as a Java applet. One such embodiment is provided in the Table 4.

It will be readily apparent to those skilled in the art, though, that alternate embodiments such as coding using alternative software languages and methodologies incorporated into or associated with products such as web browsers, router firmware, etc., may be made without departing from the spirit and scope of the invention. As such, the scope of the invention should be determined by the following claims.

TABLE 4

Example Embodiment in Java

```
1. // DomainName.java version 1.0
2. // Converts domain names in logical and display order.
3. // Steven Atkin
4. // 6/15/01
5.
6. import java.io.BufferedReader;
7. import java.io.InputStreamReader;
8. import java.io.IOException;
9. import java.util.LinkedList;
10. import java.util.Stack;
11.
12. public class DomainName {
13.
14. private class AttributedCharacter {
15. private char character;
16. private byte direction;
17. private boolean digit;
18.
19. public AttributedCharacter (char ch, byte type) {
20. character = ch;
21. digit = false;
22. direction = type;
23. // set all full stop characters to left
24. if (type == CS)
25. direction = L;
26. else if (type == EN || type == AN)
27. digit = true;
28. }
29. public byte getDir ( ) { return direction; }
30. public void setDir (byte dir) { direction = dir; }
31. public boolean isDigit( ) { return digit; }
32. public char getCharacter( ) { return character; }
33. }
34.
35. private static final byte L = 0;
36. private static final byte R = 1;
37. private static final byte AL = 2;
38. private static final byte EN = 3;
39. private static final byte ES = 4;
40. private static final byte ET = 5;
41. private static final byte AN = 6;
42. private static final byte CS = 7;
43. private static final byte BN = 8;
44. private static final byte B = 9;
45. private static final byte S = 10;
46. private static final byte WS = 11;
47. private static final byte ON = 12;
48.
49.
    :
    :
55.
56. // character mappings for 0-127
```

TABLE 4-continued

Example Embodiment in Java

```
57. private static final byte[] mixedMap = {
58. BN, BN, BN, BN, BN, BN, BN, BN,
59. BN, S, B, S, WS, B, BN, BN,
60. BN, BN, BN, BN, BN, BN, BN, BN,
61. BN, BN, BN, BN, B, B, B, S,
62. WS, ON, ON, ET, ET, ET, ON, ON,
63. ON, ON, ON, ET, CS, ET, CS, ES,
64. EN, EN, EN, EN, EN, AN, AN, AN,
65. AN, AN, CS, ON, ON, ON, ON, ON,
66. ON, AL, AL, AL, AL, AL, AL, AL,
67. AL, AL, AL, AL, AL, AL, R, R,
68. R, R, R, R, R, R, R, R,
69. R, R, R, R, R, R, R, S,
70. ON, L, L, L, L, L, L, L,
71. L, L, L, L, L, L, L, L,
72. L, L, L, L, L, L, L, L,
73. L, L, L, ON, ON, ON, ON, BN
74. };
75.
76. private byte[] activeMap = mixedMap;
77.
78. public DomainName ( ) {
79. activeMap = mixedMap;
80. }
81.
82. // Convert a logical or display domain name
83. public String convert (String domainName) {
84. LinkedList attribs = assignAttributes(domainName);
85.
86. resolveDigits(attribs);
87. resolveHyphenMinus(attribs);
88. return reorderStrong(attribs);
89. }
90.
91. // Use the character map to get the character attrributes
92. private LinkedList assignAttributes (String label) {
93. LinkedList list = new LinkedList( );
94.
95. for (int i = 0; i < label.length( ); ++i) {
96. final char character = label.charAt(i);
97. final byte type = activeMap[character];
98. list.add(new AttributedCharacter(character, type));
99. }
100. return list;
101. }
102.
103.
:
106.
107.
108.
:
112.
113. private String emptyStack(Stack stack) {
114. StringBuffer result = new StringBuffer( );
115. while(!stack.empty( ))
116. result.append(stack.pop( ));
117. return result.toString( );
118. }
119.
120.
121. // Resolve numerals
122. private void resolveDigits (LinkedList label) {
123. byte lastStrong = L;
124. boolean remaining = false;
125. int len = label.size( );
126.
127. for(int i = 0; i < len; ++i) {
128. final byte type = ((AttributedCharacter) label.get(i)).getDir( );
129. if (type == L || type == AL || type == R)
130. lastStrong = type;
131. else if (type == EN && lastStrong == L)
132. ((AttributedCharacter) label.get(i)).setDir(L);
133. else if (type == EN)
134. remaining = true;
135. else if (type == AN)
136. ((AttributedCharacter) label.get(i)).setDir(AL);
137. }
```

TABLE 4-continued

Example Embodiment in Java

```
138. // If there are any unresolved European numerals, make the second pass.
139. if (remaining) {
140. lastStrong = L;
141. for (int i = len−1; i >= 0; −−i) {
142. final byte type = ((AttributedCharacter) label.get(i)).getDir( );
143. final boolean isdigit = ((AttributedCharacter) label.get(i)).isDigit( );
144. if ((type == L || type == AL || type == R) && !isdigit)
145. lastStrong = type;
146. else if (type == EN && (lastStrong == R || lastStrong == AL))
147. ((AttributedCharacter) label.get(i)).setDir(R);
148. else if (type == EN)
149. ((AttributedCharacter) label.get(i)).setDir(L);
150. }
151. }
152. }
153.
154.
155. // Resolve hyphen-minus characters
156. private void resolveHyphenMinus (LinkedList label) {
157. byte lastStrong = L;
158. boolean remaining = false;
159. int len = label.size( );
160.
161. for (int i = 0; i < len; ++i) {
162. final byte type = ((AttributedCharacter) label.get(i)).getDir( );
163. if (type == L || type == AL || type == R)
164. lastStrong = type;
165. else if (type == ET && lastStrong == L)
166. ((AttributedCharacter) label.get(i)).setDir(L);
167. else if (type == ET)
168. remaining = true;
169. }
170. // If there are any hyphen-minus characters left, make the second pass.
171. if (remaining) {
172. lastStrong = L;
173. for(int i = len−1; i >= 0; −−i) {
174. final byte type = ((AttributedCharacter) label.get(i)).getDir( );
175. if (type == L || type == AL || type == R)
176. lastStrong = type;
177. else if (type == ET && (lastStrong == R || lastStrong == AL))
178. ((AttributedCharacter) label.get(i)).setDir(R);
179. else if (type == ET)
180. ((AttributedCharacter) label.get(i)).setDir(L);
181. }
182. }
183. }
184.
185. // Reorder the characters once their directions have been resolved
186. private String reorderStrong (LinkedList attribs) {
187. byte mode = L;
188. StringBuffer result = new StringBuffer(attribs.size( ));
189. StringBuffer digits = new StringBuffer( );
190. Stack rightStack = new Stack( );
191.
192. for (int i = 0; i < attribs.size( ); ++i) {
193. final char character = ((AttributedCharacter) attribs.get(i)).getCharacter( );
194. final byte dir = ((AttributedCharacter) attribs.get(i)).getDir( );
195. final boolean isdigit = ((AttributedCharacter) attribs.get(i)).isDigit( );
196.
197. // left-to-right characters
198. if (dir == L) {
199. if (mode == AL || mode == R) {
200. result.append(digits);
201. result.append(emptyStack(rightStack));
202. }
203. else {
204. result.append(emptyStack(rightStack));
205. result.append(digits);
206. }
207. result.append(character);
208. mode = L;
209. digits = new StringBuffer( );
210. } // end if left
211.
212. // right-to-left characters
213. else if ((dir == AL || dir == R) && !isdigit) {
214. rightStack.push(digits);
215. rightStack.push(new StringBuffer( ).append(character));
```

TABLE 4-continued

Example Embodiment in Java

```
216. mode = AL;
217. digits = new StringBuffer( );
218. } // end if Arabic or Hebrew
219.
220. // Numerals
221. else if (isdigit && (dir == AL || dir == R)) {
222. digits.append(character);
223. mode = dir;
224. } // end if Arabic or European numeral
225. } // end for loop
226.
227. // cleanup
228. if (mode == R || mode == AL) {
229. result.append(digits);
230. result.append(emptyStack(rightStack));
231. }
232. else {
233. result.append(emptyStack(rightStack));
234. result.append(digits);
235. }
236. return result.toString( );
237. }
238.
239. public static void main (String args[]) {
240. DomainName domain = new DomainName( );
241. String line = new String( );
242. BufferedReader in = new BufferedReader(new InputStreamReader(System.in));
243.
244. do {
245. try {
246. line = in.readLine( );
247. }
248. catch (IOException e) {
249. System.out.println("Error on input line");
250. }
251. if (line != null && !line.equals(""))
252. System.out.println(domain.convert(line));
253. } while (line != null && !line.equals(""));
254. }
255. }
```

What is claimed is:

1. A computer-implemented method for converting a multilingual unidirectional domain name to a multilingual bidirectional domain name, the method comprising:

receiving into a computer storage memory a multilingual unidirectional World Wide Web address, the unidirectional World Wide Web address comprising a Uniform Resource Locator or a domain name and comprising characters from at least two character sets having at least two different display orders, wherein the multilingual unidirectional address comprises more than one natural language but only one direction of reading across the entire received address;

breaking by a computer the unidirectional World Wide Web entire address into a plurality of labels delimited by a pre-determined full stop punctuation mark between the labels, the labels having an original label display order as encountered from left to right, the labels containing a plurality of characters wherein each character has a determinate display order or an indeterminate display order, the full stop punctuation mark excluding a hyphen-minus character;

within at least one of the plurality of labels, performing inferencing through resolving display directions of indeterminate display order characters by assigning a strong reading direction left-to-right display order to each indeterminate display order character;

subsequent to the resolving, converting the multilingual unidirectional World Wide Web address to a multilingual bidirectional World Wide Web address by reordering by a computer the characters within each the label into a display order using the fully resolved characters previously inferenced wherein the original label display order is preserved and bidirectionality of characters within each label is produced, wherein the multilingual bidirectional address contains at least two different directions of reading across the entire converted address; and displaying the multilingual bidirectional World Wide Web address on a computer display.

2. The method as set forth in claim 1 wherein the inferencing comprises:

first, assigning a right-to-left direction to Arabic and Hebrew letters;

second, assigning a left-to-right direction to full stop characters and other alphabetic characters;

third, resolving the directions of digits; and fourth, resolving the directions of hyphen-minus characters.

3. The method as set forth in claim 2 wherein the resolving directions of digits comprises:

assigning a right-to-left direction to Arabic numerals; and assigning a left-to-right direction to European numerals, unless a European numeral is surrounded by right-to-left characters such as Arabic or Hebrew letters, in which case assigning a right-to-left direction.

4. The method as set forth in claim 2 wherein the resolving directions of hyphen-minus characters comprises:

assigning a left-to-right direction to all hyphen-minus characters which are not surrounded by characters whose direction is right-to-left; and assigning a right-to-left direction to all hyphen-minus characters which are surrounded by characters whose direction is right-to-left.

5. The method as set forth in claim 1 wherein the pre-determined full stop punctuation mark used as a delimiter between the labels comprises a Latin period punctuation mark.

6. A computer readable storage memory comprising:

a computer storage memory suitable for encoding computer programs; and one or more computer programs encoded by the computer memory storage, the computer program:

receiving into a computer storage memory a multilingual unidirectional World Wide Web address, the unidirectional World Wide Web address comprising a Uniform Resource Locator or a domain name and comprising characters from at least two character sets having at least two different display orders, wherein the multilingual unidirectional address comprises more than one natural language but only one direction of reading across the entire received address;

breaking by a computer the unidirectional World Wide Web entire address into a plurality of labels delimited by pre-determined full stop punctuation mark between the labels, the labels having an original label display order as encountered from left to right, the labels containing a plurality of characters wherein each character has a determinate display order or an indeterminate display order, the full stop punctuation mark excluding a hyphen-minus character;

within at least one of the plurality of labels, performing inferencing through resolving display directions of indeterminate display order characters by assigning a strong direction left-to-right display order to each indeterminate display order character;

subsequent to the resolving, converting the multilingual unidirectional World Wide Web address to a multilingual bidirectional World Wide Web address by reordering by a computer the characters within each the label into a display order using the fully resolved characters previously inferenced wherein the original label display order is preserved and bidirectionality of characters within each label is produced, wherein the multilingual bidirectional address contains at least two different directions of reading across the entire converted address; and displaying the multilingual bidirectional World Wide Web address on a computer display.

7. The computer readable storage memory as set forth in claim 6 wherein the inferencing comprises:

first, assigning a right-to-left direction to Arabic and Hebrew letters;

second, assigning a left-to-right direction to full stop characters and other alphabetic characters;

third, resolving the directions of digits; and fourth, resolving the directions of hyphen-minus characters.

8. The computer readable memory as set forth in claim 7 wherein the resolving directions of digits comprises:

assigning a right-to-left direction to Arabic numerals; and assigning a left-to-right direction to European numerals, unless a European numeral is surrounded by right-to-left characters such as Arabic or Hebrew letters, in which case assigning a right-to-left direction.

9. The computer readable memory as set forth in claim 7 wherein the resolving directions of hyphen-minus characters comprises:

assigning a left-to-right direction to all hyphen-minus characters which are not surrounded by characters whose direction is right-to-left; and assigning a right-to-left direction to all hyphen-minus characters which are surrounded by characters whose direction is right-to-left.

10. The computer-readable memory as set forth in claim 6 wherein the pre-determined full stop punctuation mark used as a delimiter between the labels comprises a Latin period punctuation mark.

11. A system which converts a unidirectional domain name to a bidirectional domain name comprising:

a computer platform having a central processing unit for performing logical processes;

an input portion of the computing platform receiving into a computer storage memory a multilingual unidirectional World Wide Web address, the unidirectional World Wide Web address comprising a Uniform Resource Locator or a domain name and comprising characters from at least two character sets having at least two different display orders, wherein the multilingual unidirectional address comprises more than one natural language but only one direction of reading across the entire received address;

a label definer portion of the computer platform breaking the unidirectional World Wide Web entire address into a plurality of labels delimited by pre-determined full stop punctuation mark between the labels, the labels having an original label display order as encountered from left to right, the labels containing a plurality of characters wherein each character has a determinate display order or an indeterminate display order, the full stop punctuation mark excluding a hyphen-minus character;

an inferencer portion of the computing platform performing within at least one of the plurality of labels inferencing through resolving display directions of indeterminate display order characters by assigning a strong direction left-to-right display order to each indeterminate display order character;

a character reorderer portion of the computing platform converting subsequent to the resolving the multilingual unidirectional World Wide Web address to a multilingual bidirectional World Wide Web address by reordering by a computer the characters within each the label into a display order using the fully resolved characters previously inferenced wherein the original label display order is preserved and bidirectionality of characters within each label is produced, wherein the multilingual bidirectional address contains at least two different directions of reading across the entire converted address; and a user display portion of the computing platform displaying the multilingual bidirectional World Wide Web address on a computer display.

12. The system as set forth in claim 11 wherein the inferencer comprises:

a first direction assignor assigning a right-to-left direction to Arabic and Hebrew letters;

a second direction assignor assigning a left-to-right direction to full stop characters and other alphabetic characters;

a third direction assignor resolving the directions of digits; and a fourth direction assignor for resolving the directions of hyphen-minus characters.

13. The system as set forth in claim 12 wherein the third direction assignor comprises:
- a right-to-left direction assignor operative on Arabic numerals, and for all European numerals which are surrounded by right-to-left characters such as Arabic and Hebrew letters; and
- a left-to-right direction assignor operative on European numerals which are not surrounded by right-to-left characters such as Arabic or Hebrew letters.

14. The system as set forth in claim 12 wherein the fourth direction assignor comprises:
- a left-to-right direction assignor for hyphen-minus characters which are not surrounded by characters whose direction is right-to-left; and
- a right-to-left direction assignor for hyphen-minus characters which are surrounded by characters whose direction is right-to-left.

15. The system as set forth in claim 11 wherein the predetermined full stop punctuation mark used as a delimiter between the labels comprises a Latin period punctuation mark.

* * * * *